Aug. 22, 1939.　　　M. HÜRLIMANN　　　2,170,499
ELECTRIC VALVE PROTECTIVE SYSTEM
Filed March 9, 1935　　　2 Sheets-Sheet 1

Inventor
M. Hürlimann
by G. J. Elbein
Attorney

Patented Aug. 22, 1939

2,170,499

UNITED STATES PATENT OFFICE 2,170,499

ELECTRIC VALVE PROTECTIVE SYSTEM

Max Hürlimann, Baden, Switzerland, assignor to Aktiengesellschaft Brown Boveri & Cie., Baden, Switzerland, a joint-stock company of Switzerland Application March 9, 1935, Serial No. 10,163
In Switzerland March 29, 1934

17 Claims. (Cl. 175—363)

This invention relates in general to improvements in electric valve protective systems, and more particularly to means for interrupting the flow of current through an electric valve utilized in a direct current inverting system upon occurrence of a disturbance in the operation thereof.

In direct current inverting systems utilizing an electric valve, the direct current line supplying current to the alternating current output line through the valve becomes, substantially in effect, short circuited through the valve upon occurrence of a short circuit in the alternating current line. If the inverting system utilizes a plurality of valves, such short circuit may also result from irregularities in the sequence of operation of the valves. Such irregularities may be caused by faulty operation of the control electrodes of the valves, or by increase of the flow of current through the valves beyond the so-called load limit thereof as a result of an overload in the alternating current line or of an abnormal decrease of the voltage thereof. The flow of current resulting from such short circuit is a continuous flow through one of the valves and, if the valves are of the discontinuously controllable type, such flow of current cannot be interrupted by the action of the control electrodes thereof. Such interruption is then preferably obtained by discharge of a capacitor through an additional valve connected thereby across the direct current supply line.

It is therefore one of the objects of the present invention to provide a protective system for an electric valve utilized for inverting direct current by which the flow of current through the valve may be rapidly interrupted.

Another object of the present invention is to provide a protective system for an electric valve utilized for inverting direct current by which the flow of current from the supply line may be diverted from the valve by discharge of a capacitor.

Another object of the present invention is to provide a protective system for an electric valve utilized for inverting direct current by which the valve may be rendered non-conductive upon interruption of the flow of current therethrough.

Figure 1:
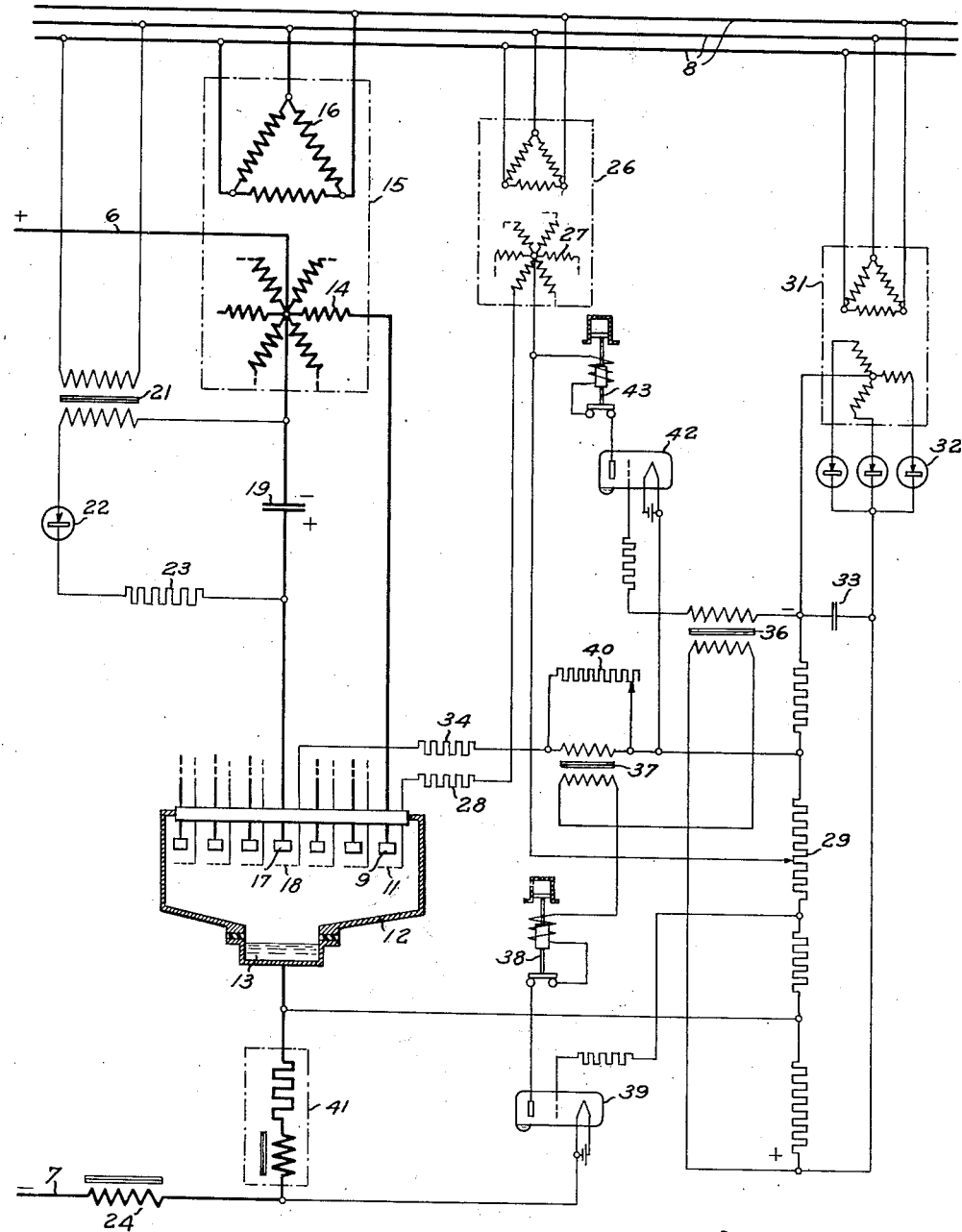
Figure 2:
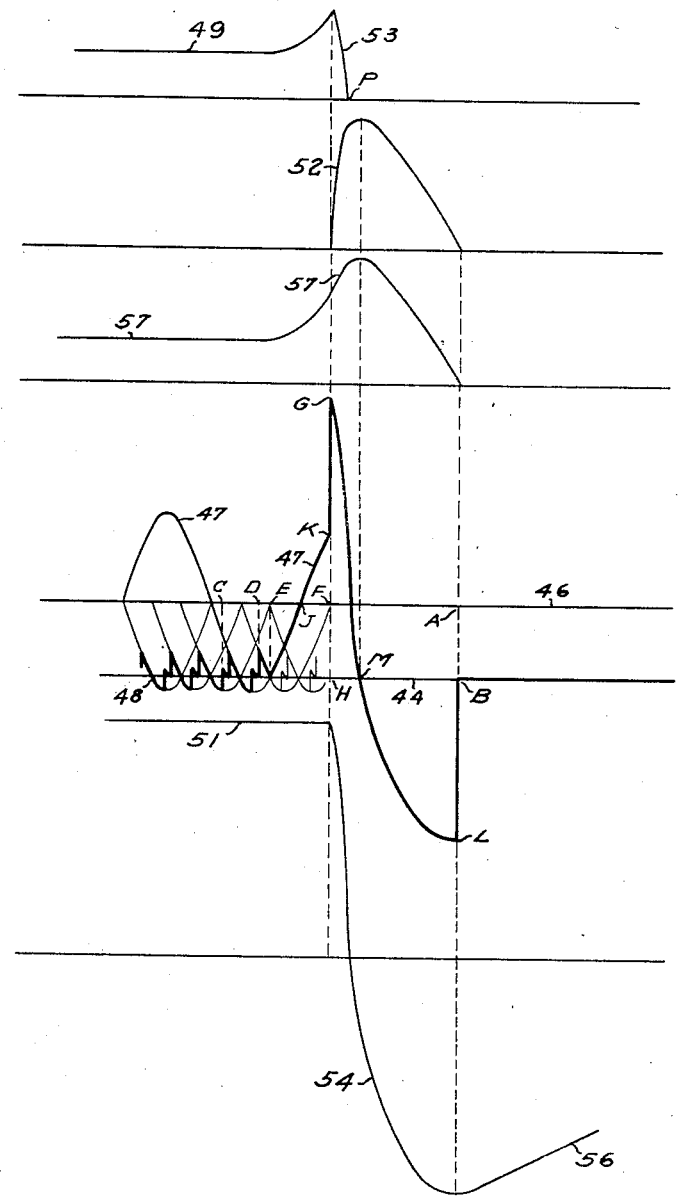

Objects and advantages other than those above set forth will be apparent from the following description when read in connection with the accompanying drawings, in which:

Fig. 1 diagrammatically illustrates one embodiment of the present invention in which the operation of the protective system is controlled by means of auxiliary electric valves; and Fig. 2 is a diagram of some of the currents and voltages present in the circuits of the embodiment illustrated in Figure 1.

Referring more particularly to the drawings by characters of reference, reference numeral 6 designates the positive conductor of a direct current supply line energized from a suitable generator (not shown) and having a negative conductor 7. Line 6, 7 supplies direct current to be inverted into alternating current by the translating system hereinafter described, such inverted current being supplied to an alternating current output line 8, the frequency and voltage of which are determined by suitable means such as a synchronous generator (not shown) connected therewith, as is well known in the art. The translating system comprises an electric valve or, preferably, a plurality of electric valves of any suitable type. Each valve comprises an anode 9 with an associated control electrode 11; each valve may be arranged in a separate valve structure having a cathode, but the valves are preferably all arranged within a single structure or so-called rectifier 12 provided with a cathode 13 common to all valves and connected with conductor 7. Cathode 13 is provided with suitable means for bringing and maintaining such cathode in current conductive condition as is well known in the art. Rectifier 12 is herein illustrated as being of the discontinuously controllable type in which the flow of current cannot be interrupted by the action of the control electrodes thereof.

Each anode such as anode 9 is connected with one terminal of an inductive winding 14 having another terminal connected with conductor 6, each winding thus being connected across line 6, 7 by the associated valve or valve path. The several windings 14 preferably constitute the primary winding structure of a polyphase transformer 15 having a polyphase winding 16 connected with line 8. In addition to the above mentioned valves, rectifier 12 also comprises another valve consisting of an anode 17 with an associated control electrode 18 and the common cathode 13. Such valve connects a capacitor 19 across line 6, 7 in parallel with the inductive windings 14. Capacitor 19 may be gradually charged and maintained in charged condition by suitable means, such as a transformer 21 energized from line 8 and having the secondary winding thereof connected across capacitor 19 through an auxiliary electric valve 22 and a resistor 23. Capacitor 19 is charged at a voltage which is preferably of a value several times greater than the value of the voltage of lines 6, 7. For the proper operation of capacitor 19, line 6, 7 must have an inductance of high values compared to the inductance of the inductive windings 14, and such line may accordingly be provided with a reactor 24.

The operation of the translating system consisting of rectifier 12 and transformer 16 is controlled by suitable means for normally energizing the control electrodes 11 to cause the valves 9, 13 to become intermittently and sequentially conductive. Such means preferably include a transformer 26 energized from line 8 and having secondary winding portions 27 severally connected with the control electrodes 11 through resistors 28. The common point of such winding portions is connected with cathode 13 through the taps of a voltage divider 29, upon which a unidirectional voltage is impressed from line 8 through transformer 31 and through auxiliary valves 32, such voltage being rendered substantially uniform by the action of a capacitor 33. Control electrode 18 is connected with a tap of voltage divider 29 through a resistor 34. The positive terminal of voltage divider 29 is connected with cathode 13 through the primary windings of two control transformers 36 and 37, through the coil and the contacts of a time delay relay 38, through an auxiliary discontinuously controllable valve 39 which is controlled through a shunt 41 inserted in conductor 7. Shunt 41 may be substantially non-inductive, but is preferably made inductive as diagrammatically illustrated in the drawings. Valve 39 is provided with a control electrode connected with a suitable tap of voltage divider 29. The secondary winding of transformer 37 is inserted in the connection of control electrode 18 with voltage divider 29 and may be bridged by a surge limiting resistor 40. The secondary winding of transformer 36 is connected between the negative terminal of voltage divider 29 and the control electrode of an auxiliary discontinuously controllable valve 42 connecting the common point of windings 27 with voltage divider 29 through the coil and the contacts of a time delay relay 43.

In normal operation, lines 6, 7 and 8 being energized, voltage divider 29 and transformer 26 cooperate to impress superimposed unidirectional and alternating voltages between cathode 13 and control electrodes 11, thereby causing each control electrode to be brought to superimposed unidirectional and alternating potentials with respect to the potential of cathode 13 taken as datum. Each control electrode 11 releases the flow of current through the associated anode upon reaching a potential more positive than the so-called critical potential, which will be assumed to be equal to cathode potential for the purpose of simplifying the explanation of the operation of the system. The flow of current through each anode 9 is released by the associated control electrode 11 when the potential of the anode follows the falling portion of the wave thereof but is more positive than the potential of cathode 13. In the diagram illustrated in Figure 2, the potential of conductor 7 is represented by line 44, the potential of conductor 6 being represented by line 46 distant therefrom by an ordinate AB representing the voltage of the direct current source connected with the line. The potential of a particular one of anodes 9, of which the operation will be more particularly considered, may then be represented by a sine curve 47 having line 46 as its axis. The flow of current is sequentially released through the several anodes to cause the potential of cathode 13 to follow an undulating line 48 constituted of successive portions of sine waves as is well known. During such operation, the flow of current through each anode is interrupted as a result of the release of the flow of current through the following anode, which is then at a higher potential, and a reestablishment of such flow of current through the anode being considered must be prevented until such anode returns to the proper potential. As each anode 9 is at positive potentials during the major portion of the inoperative period thereof, transformer 26 and voltage divider 29 must be so adjusted that each control electrode not only assumes a positive potential at a proper point of the cycle to release the flow of current through the associated anode, but must also retain such potential for a period of time not longer than the operating period of the anode. The flow of current through cathode 13 is then a substantially uniform current which may be represented by line 49 in Figure 2. Valve 17, 13 is then maintained non-conductive by control electrode 18 which is continuously maintained negative by voltage divider 29. Capacitor 19 may therefore be charged from line 8 through transformer 21, valve 22 and resistor 23 and the voltage across the capacitor remains substantially constant at a value represented by line 51 in Figure 2. The control electrodes of valves 39 and 42 are continuously maintained negative with respect to the associated cathodes, and such valves therefore are maintained non-conductive.

To illustrate the operation of the protective system, it will be assumed that the anode 9 being considered carries current, under a voltage represented principally by curve 47, during a time interval, CD which is the normal operating interval thereof. Such flow of current is interrupted by transfer of the flow of current to the following anode, the anode 9 considered again becoming positive with respect to cathode 13 at a time represented by point E. It will also be assumed that anode 9 again carries current at point E as a result of the failure of the associated control electrode 11 to then maintain the valve 9, 13 considered in non-conductive condition. From time E on, the potential of cathode 13 accordingly substantially follows curve 47, as such cathode is then substantially at the potential of anode 9. The electromotive force opposed by the associated winding 14 to the voltage of line 6, 7 to limit the flow of current therethrough, and which normally has an average effective value substantially represented by ordinate AB, then gradually decreases to reach the value zero at time J. Valve 9, 13 and winding 14 then, in effect, constitute a short circuit for line 6, 7, and the voltage of winding 14 thereafter even adds to the voltage of line 6, 7 instead of being opposed thereto.

The net voltage causing the flow of current through valve 9, 13 is then represented by curve 47 when read with respect to line 44, and such voltage is impressed mainly across reactor 24 which constitutes the major portion of the impedance of the circuit. The flow of current therethrough accordingly increases from the value represented by line 49, thereby causing the terminal voltage of shunt 41 to increase in proportion to the flow of current if the shunt is principally resistive, and also in relation with the rate of change of the flow of current therethrough if the shunt is inductive.

The connections of valve 39 are so adjusted that such increase in the voltage across shunt 41 depresses the potential of the cathode of tube 39 below the potential of the associated control electrode, thus rendering valve 39 conductive at a time such as time F. A flow of current of predetermined value is thus suddenly initiated from voltage divider 29 through the primary windings of transformers 36 and 37, the coil of relay 38, valve 39 and shunt 41 back to voltage divider 29. Such sudden initiation of the flow of current through the primary winding of transformer 36 causes the appearance in the secondary winding thereof of a positive voltage impulse of sufficient magnitude to momentarily render the control electrode of valve 42 positive with respect to the associated cathode. Valve 42 accordingly becomes conductive and, by short circuiting a portion of voltage divider 29, causes the potential of the common point of windings 27 to become more negative to an extent such as to continuously maintain the control electrodes 11 at a negative potential, thereby preventing the further transfer of the discharge from one of anodes 9 to another, and also preventing the reestablishment of flow of current through rectifier 12 after interruption thereof by the process set forth hereinafter.

A positive voltage impulse also appears in the secondary winding of transformer 37, such impulse being of magnitude sufficient to cause electrode 18 to become momentarily positive. Valve 17, 13 is accordingly made conductive and capacitor 19 is discharged therethrough into line 6, 7. Cathode 13 is thereby brought substantially instantly to a potential represented by point G, of which the ordinate GF is equal to the ordinate of line 51, the voltage then impressed across reactor 24 being represented by ordinate GH. The flow of current through anode 17 may be represented by a curve 52, such flow of current tending to become oscillating as a result of the serial connection of capacitor 19 with reactor 24, but being limited to a single unidirectional impulse by the action of valve 17, 13.

Upon valve 17, 13 being made conductive, the current then flowing through cathode 13 from anode 9 is diverted from such anode and starts to flow instead through anode 17. Although cathode 13 is thereby brought to the potential represented by point G, which is higher than the potential of anode 9 represented by point K. The flow of current through anode 9 is temporarily maintained by the magnetic energy stored in the core of winding 14 and rapidly falls to zero as is indicated by curve 53. Such decay of the anode current occurs as if the discharge of capacitor 19 were actually sending, through anode 9 and winding 14, a reverse current component, which becomes of considerably greater magnitude than the current sent by the capacitor through cathode 13, reactor 24 and line 6, 7 as a result of the large inductance of the reactor compared to that of winding 14. The flow of current through valve 9, 13 having ceased, such flow of current is not reestablished therethrough for the reason that control electrode 11 is then already made negative by the operation of valve 42. The flow of current through anode 17 continues even after capacitor 19 is completely discharged, to return to the capacitor the energy stored in the core of reactor 24, the capacitor being thereby recharged at a voltage somewhat less in magnitude than the initial voltage thereof and of opposite polarity. During such discharge and reverse charge of capacitor 19, the voltage thereof follows curve 54 and the potential of cathode 13 follows curve GML.

The flow of current through capacitor 19 then stops as a result of the action of valve 17, 13, and the potential of cathode 13 is then brought to the potential of conductor 7 and maintained at such potential by the source connected with line 6, 7. The course of the potential of cathode 13 during the above described sequence of operations is represented in heavy line in Fig. 2. During such sequence of operations, transformer 21 and valve 22 continue to supply current to capacitor 19 and, upon interruption of the flow of current through valve 17, 13, gradually recharge the capacitor under a voltage following curve 56. Such charging continues even when anode 17 becomes positive with respect to cathode 13, valve 17, 13 being continuously maintained non-conductive by control electrode 18 in the absence of positive impulses in the secondary winding of transformer 37.

It will be observed that, during the above sequence of operations, the current flowing through cathode 13 is the sum of the current through winding 14 and through capacitor 19, and may therefore be represented by a curve 57 having ordinates equal to the sum of ordinates of curves 49, 52 and 53. Such current reaches a maximum value when the cathode potential reaches the potential of conductor 7 at time M. In the absence of valve 42, the flow of current would then reestablish itself through the valves 9, 13 of rectifier 12, and the translating system would automatically return to the normal operation thereof, except that, as a result of the inductance of reactor 24, such flow of current would initially tend to maintain the cathode current at the value reached thereby at time M.

The elements of the translating system may be so dimensioned that such flow of current then does not exceed the so-called load limit thereof in that even then each valve of the rectifier, after carrying current, transfers its current to the following valve and thereafter becomes deionized and is made non-conductive while still negative with respect to the potential of the cathode, so that the flow of current may be normally commutated between anodes. Under such conditions valve 42 may be omitted and the normal operation of the system is restored at time M.

In general, however, the flow of current at time M exceeds the load limit of the translating system, and resumption of normal operation at such time would generally result in the occurrence of another short circuit through one of the valves. Valve 42 is therefore utilized for rendering all valves 9, 13 non-conductive at time F, except that the valve then carrying current becomes non-conductive upon interruption of the flow of current therethrough at time P. During the interrupting operation, the flow of current through the primary winding of transformer 37 is of constant value, and such transformer is therefore without further action on the potential of control electrode 18, which is again maintained at a negative potential by means of voltage divider 29. Valve 17, 13 accordingly becomes non-conductive immediately upon cessation of the flow of current therethrough, thereby permitting recharging of capacitor 19.

After a predetermined time delay, relay 38 opens the contacts thereof to cause valve 39 to again become non-conductive, such operation causing the appearance, in the secondary windings of transformers 36, 37, of voltage impulses of such polarity as not to affect the operation of the system. Relay 43 thereafter also opens the contacts thereof, thereby returning valve 42 to the non-conductive condition and causing the unidirectional potential of control electrodes 11 to return to the normal value thereof to reestablish the normal operation of rectifier 12. Relay 43 is preferably so adjusted as to operate only after capacitor 19 is again substantially completely charged so that the capacitor may already operate to extinguish any short circuits in rectifier 12 immediately upon reestablishment of the flow of current to the rectifier.

It will be apparent that, under favorable circumstances, the circuits of the system may be so arranged that control electrode 18 renders valve 17, 13 conductive before the time J at which the voltage of winding 14 reverses. If capacitor 19 is not then charged, anode 17 is at the potential of conductor 6 represented by line 46 in Fig. 2 and is therefore at a higher potential than the anode 9 considered. The flow of current thruogh anode 9 may then again be diverted to anode 17 if the electrical characteristics of the circuits are within suitable ranges of values. The charging means for capacitor 19 may then be omitted, but in general such charging means are preferably retained to insure operation of the protective system in the manner above described.

Although but one embodiment of the present invention has been described and illustrated, it will be apparent to those skilled in the art that various changes and modifications may be made therein without departing from the spirit of the invention or from the scope of the appended claims.

It is claimed and desired to secure by Letters Patent:

1. An electric current inverting system comprising a direct current supply line, an alternating current output line, an inductive winding connected with said alternating current line, an electric valve connecting the said winding across said direct current line for the flow of current therethrough to said alternating current line, another electric valve, a capacitor connecting the second said valve across said direct current line, and means for causing interruption of the flow of current through the first said valve including means for rendering the second said valve conductive.

2. An electric current inverting system comprising a direct current supply line, an alternating current output line, an inductive winding connected with said alternating current line, an electric valve connecting the said winding across said direct current line for the flow of current therethrough to said alternating current line, another electric valve, a capacitor connecting the second said valve across said direct current line, means for causing interruption of the said flow of current through the first said valve including means for causing discharge of the said capacitor through the second said valve, and means for preventing the reestablishment of the flow of current through the first said valve.

3. An electric current inverting system comprising a direct current supply line, an alternating current output line, an inductive winding connected with said alternating current line, an electric valve connecting the said winding across said direct current line for the flow of current therethrough to said alternating current line, another electric valve, a capacitor connecting the second said valve across said direct current line, and means for causing interruption of the said flow of current through the first said valve including means responsive to an operative condition of said system for causing said capacitor to discharge through the second said valve.

4. An electric current inverting system comprising a direct current supply line, an alternating current output line, an inductive winding connected with said alternating current line, an electric valve connecting the said winding across said direct current line for the flow of current therethrough to said alternating current line, another electric valve, a capacitor connecting the second said valve across said direct current line, and means for causing interruption of the said flow of current through the first said valve including means operable upon the occurrence of substantial short circuiting of said direct current line through the first said valve to render the second said valve conductive.

5. An electric current inverting system comprising a direct current supply line, an alternating current output line, an inductive winding connected with said alternating current line, an electric valve connecting the said winding across said direct current line for the flow of current therethrough to said alternating current line, another electric valve, a capacitor connecting the second said valve across said direct current line, means for charging said capacitor, and means for causing interruption of the said flow of current through the first said valve and including means for rendering the second said valve conductive.

6. An electric current inverting system comprising a direct current supply line, an alternating current output line, an inductive winding connected with said alternating current line, an electric valve connecting the said winding across said direct current line for the flow of current therethrough to said alternating current line, another electric valve, a capacitor connecting the second said valve across said direct current line, means for rendering the first said valve intermittently conductive to control the flow of current to said alternating current line, means for normally maintaining the second said valve non-conductive, and means for causing interruption of the said flow of current through the first said valve and including means for rendering the second said valve conductive.

7. An electric current inverting system comprising a direct current supply line, an alternating current output line, an inductive winding connected with said alternating current line, an electric valve connecting the said winding across said direct current line for the flow of current therethrough to said alternating current line, another electric valve, a capacitor connecting the second said valve across said direct current line, means for rendering the first said valve intermittently conductive to control the said flow of current, means for normally maintaining the second said valve non-conductive, means for causing interruption of the said flow of current through the first said valve incuding means for rendering the second said valve conductive, and means for rendering the second said valve non-conductive upon interruption of the flow of current therethrough.

8. An electric current inverting system comprising a direct current supply line, an alternating current output line, an inductive winding connected with said alternating current line, an electric valve connecting the said winding across said direct current line for the flow of current therethrough to said alternating current line and having a control electrode for controlling the operation thereof, a capacitor, means for gradually charging said capacitor, another electric valve connecting said capacitor across said direct current line and having a control electrode, means for normally maintaining the second said control electrode at a potential for maintaining the second said valve non-conductive, means for normally energizing the first said control electrode at potentials rendering the first said valve intermittently conductive, and means for causing interruption of the said flow of current through the first said valve including means for varying the potential of the second said control electrode to render the second said valve conductive.

9. In an electric translating system, a direct current supply line, an alternating current output line, an inductive winding connected with said alternating current line, an electric valve connecting the said winding across said direct current line for the exchange of current between said lines and having a control electrode for controlling the operation thereof, a capacitor, means for gradually charging said capacitor, another electric valve connecting said capacitor across said direct current line and having a control electrode, means for normally maintaining the second said valve non-conductive, means for normally energizing the first said control electrode at potentials rendering the first said valve intermittently conductive, means for causing interruption of the flow of current through the first said valve including means for varying the potential of the second said control electrode to render the second said valve conductive, and means for varying the potential of the first said control electrode to render the first said valve non-conductive upon interruption of the flow of current therethrough.

10. In an electric translating system, a direct current supply line, an alternating current output line, an inductive winding connected with said alternating current line, an electric valve connecting the said winding across said direct current line for the exchange of current between said lines and having a control electrode for controlling the operation thereof, a capacitor, means for gradually charging said capacitor, another electric valve connecting said capacitor across said direct current line and having a control electrode, means for normally maintaining the second said control electrode at a potential maintaining the second said valve non-conductive, means for impressing superimposed unidirectional and alternating potentials on the first said control electrode to render the first said valve intermittently conductive, means for causing interruption of the flow of current through the first said valve including means for varying the potential of the second said control electrode to render the second said valve conductive, and means for giving a negative increment to the said unidirectional potential to render the first said valve non-conductive upon interruption of the flow of current therethrough.

11. An electric current inverting system comprising a direct current supply line, an alternating current output line, an inductive winding connected with said alternating current line, an electric valve connecting the said winding across said direct current line for the flow of current therethrough to said alternating current line, another electric valve, a capacitor connecting the second said valve across said direct current line, means for causing interruption of the said flow of current through the first said valve including means responsive to an operating condition of said system for causing said capacitor to discharge through the second said valve and through said direct current line, and means comprising a reactor for limiting the rate of discharge of said capacitor through said direct current line.

12. An electric current inverting system comprising a direct current supply line, an alternating current output line, an inductive winding connected with said alternating current line, an electric valve connecting the said winding across said direct current line for the flow of current therethrough to said alternating current line, another electric valve, a capacitor connecting the second said valve across said direct current line, means for charging said capacitor, means for causing interruption of the said flow of current through the first said valve including means for rendering the second said valve conductive, and a reactor in said direct current line to oppose variations in the magnitude of the flow of current therein.

13. An electric current inverting system comprising a direct current supply line, an alternating current output line, a plurality of inductive windings connected with said alternating current line, a plurality of electric valves severally connecting said windings across said direct current line for the flow of current therethrough to said alternating current line, a capacitor, means for maintaining said capacitor in charged condition, another electric valve connecting said capacitor across said direct current line, and means for causing interruption of the said flow of current through said plurality of valves including means for rendering the second said valve conductive.

14. An electric current inverting system comprising a direct current supply line, an alternating current output line, a plurality of inductive windings connected with said alternating current line, a plurality of electric valves severally connecting said windings across said direct current line for the flow of current therethrough to said alternating current line, a capacitor, means for maintaining said capacitor in charged condition, another electric valve connecting said capacitor across said direct current line, means for causing interruption of the said flow of current through said plurality of valves including means for rendering the second said valve conductive, and means for rendering said plurality of valves non-conductive upon cessation of the flow of current therethrough.

15. An electric current inverting system comprising a direct current supply line, an alternating current output line, a plurality of inductive windings connected with said alternating current line, a plurality of electric valves severally connecting said windings across said direct current line for the flow of current therethrough to said alternating current line, a capacitor, means for maintaining said capacitor in charged condition, another electric valve connecting said capacitor across said direct current line, means for causing interruption of the said flow of current through said plurality of valves including means for rendering the second said valve conductive, and means for rendering said plurality of valves non-conductive upon cessation of the flow of current therethrough, and a reactor in said direct current line to limit the rate of discharge of said capacitor therethrough.

16. An electric current inverting system comprising a direct current supply line, an alternating current output line, an inductive winding connected with said alternating current line, an electric valve connecting the said winding across said direct current line for the flow of current therethrough to said alternating current line, another electric valve, a capacitor connecting the second said valve across said direct current line, means for rendering the first said valve intermitently conductive to control the said flow of current therethrough, means for normally maintaining the second said valve non-conductive, means for causing interruption of the said flow of current through the first said valve including means for rendering the second said valve conductive, and means for rendering the first said valve non-conductive upon interruption of the flow of current therethrough.

17. An electric current inverting system comprising a direct current supply line, an alternating current output line, an inductive winding connected with said alternating current line, an electric valve connecting the said winding across said direct current line for the flow of current therethrough to said alternating current line, another electric valve, a capacitor connecting the second said valve across said direct current line, means for rendering the first said valve intermittently conductive to control the said flow of current therethrough, means for normally maintaining the second said valve non-conductive, means for causing interruption of the said flow of current through the first said valve including means for rendering the second said valve conductive, means for rendering the first said valve non-conductive upon interruption of the said flow of current therethrough, and means for rendering the second said valve non-conductive upon interruption of the flow of current therethrough.

MAX HÜRLIMANN.